US012739229B2

(12) United States Patent
Kulakowski et al.

(10) Patent No.: US 12,739,229 B2
(45) Date of Patent: Sep. 15, 2026

(54) ONE-TIME VIRTUAL PRIVATE NETWORK

(71) Applicant: INTERNATIONAL BUSINESS MACHINES CORPORATION, Armonk, NY (US)

(72) Inventors: Christopher A. Kulakowski, Austin, TX (US); Andrew Low, Stittsville (CA); Troy E Fisher, Phoenixville, PA (US); James McConnell, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 72 days.

(21) Appl. No.: 18/746,258

(22) Filed: Jun. 18, 2024

(65) Prior Publication Data

US 2025/0385892 A1 Dec. 18, 2025

(51) Int. Cl.
*H04L 9/40* (2022.01)

(52) U.S. Cl.
CPC ...... *H04L 63/0272* (2013.01); *H04L 63/0807* (2013.01)

(58) Field of Classification Search
CPC ........................ H04L 63/0272; H04L 63/0807
See application file for complete search history.

(56) References Cited

U.S. PATENT DOCUMENTS 10,333,925 B2 6/2019 Schwarz
10,382,426 B2 8/2019 Falodiya
10,412,070 B2 9/2019 McNeely
11,128,624 B2 * 9/2021 Wijaya ................ H04L 63/0884
2007/0186277 A1 8/2007 Loesch
2017/0366646 A1 * 12/2017 Bradley ................ H04W 12/06
2017/0373852 A1 12/2017 Cassin
2018/0324186 A1 * 11/2018 Dintenfass .............. G06F 21/31
2021/0289576 A1 * 9/2021 Cheaz .................... A61B 5/747
2022/0231851 A1 7/2022 Cassin
2024/0380752 A1 * 11/2024 Khare ................. H04L 63/0884
2025/0267139 A1 * 8/2025 Akkarakaran Jose ....................... H04L 63/0807

OTHER PUBLICATIONS

Disclosed Anonymously, “A Shortcut Authentication Mechanism for VPN”, IP.com, IPCOM000269972D, May 27, 2022, 6 pages.

(Continued)

*Primary Examiner* — Anh Nguyen
(74) *Attorney, Agent, or Firm* — Rakesh Roy

(57) ABSTRACT

A method, computer system, and a computer program product for one-time virtual private network (OTVPN) tunneling is provided. The present invention may include receiving an authentication request from a client to access a private network for a pre-defined transaction. The present invention may also include validating the client for the pre-defined transaction. The present invention may also include granting a temporary access for the client to perform the pre-defined transaction in the private network. The present invention may also include terminating the temporary access granted to the client to the private network responsive to a policy configuration associated with the pre-defined transaction.

20 Claims, 3 Drawing Sheets

(56) References Cited

OTHER PUBLICATIONS

IBM, "AI-driven cybersecurity solutions that evolve with your business", https://www.ibm.com/security, Accessed on Mar. 27, 2024, 11 Pages.
Jones, et al., "JSON Web Token (JWT)", Internet Engineering Task Force (IETF), May 2015, 30 Pages. https://datatracker.ietf.org/doc/html/rfc7519.
Securing hybrid cloud and AI, Retrieved from: https://web.archive.org/web/20251010181641/https://www.ibm.com/solutions/security, Oct. 10, 2025, 12 pages.

* cited by examiner

ONE-TIME VIRTUAL PRIVATE NETWORK

BACKGROUND

The present invention relates generally to the field of computing, and more particularly to network security.

Access to enterprise and private networks are often secured using a Virtual Private Network (VPN). A VPN may allow authenticated users and clients to access a private network securely from any location over the internet. However, current VPN solutions include several drawbacks, such as the increased risk of intrusion into a private network by an unauthorized entity. Many network breaches today begin with compromised VPN credentials or a compromised client that allows an attacker to access a private network and all resources that reside within the private network.

SUMMARY

Embodiments of the present invention disclose a method, computer system, and a computer program product for one-time virtual private network (OTVPN) tunneling. In one embodiment, the present invention may include receiving an authentication request from a client to access a private network for a pre-defined transaction. In one embodiment, the present invention may also include validating the client for the pre-defined transaction. In one embodiment, the present invention may also include granting a temporary access for the client to perform the pre-defined transaction in the private network. In one embodiment, the present invention may also include terminating the temporary access granted to the client to the private network responsive to a policy configuration associated with the pre-defined transaction.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
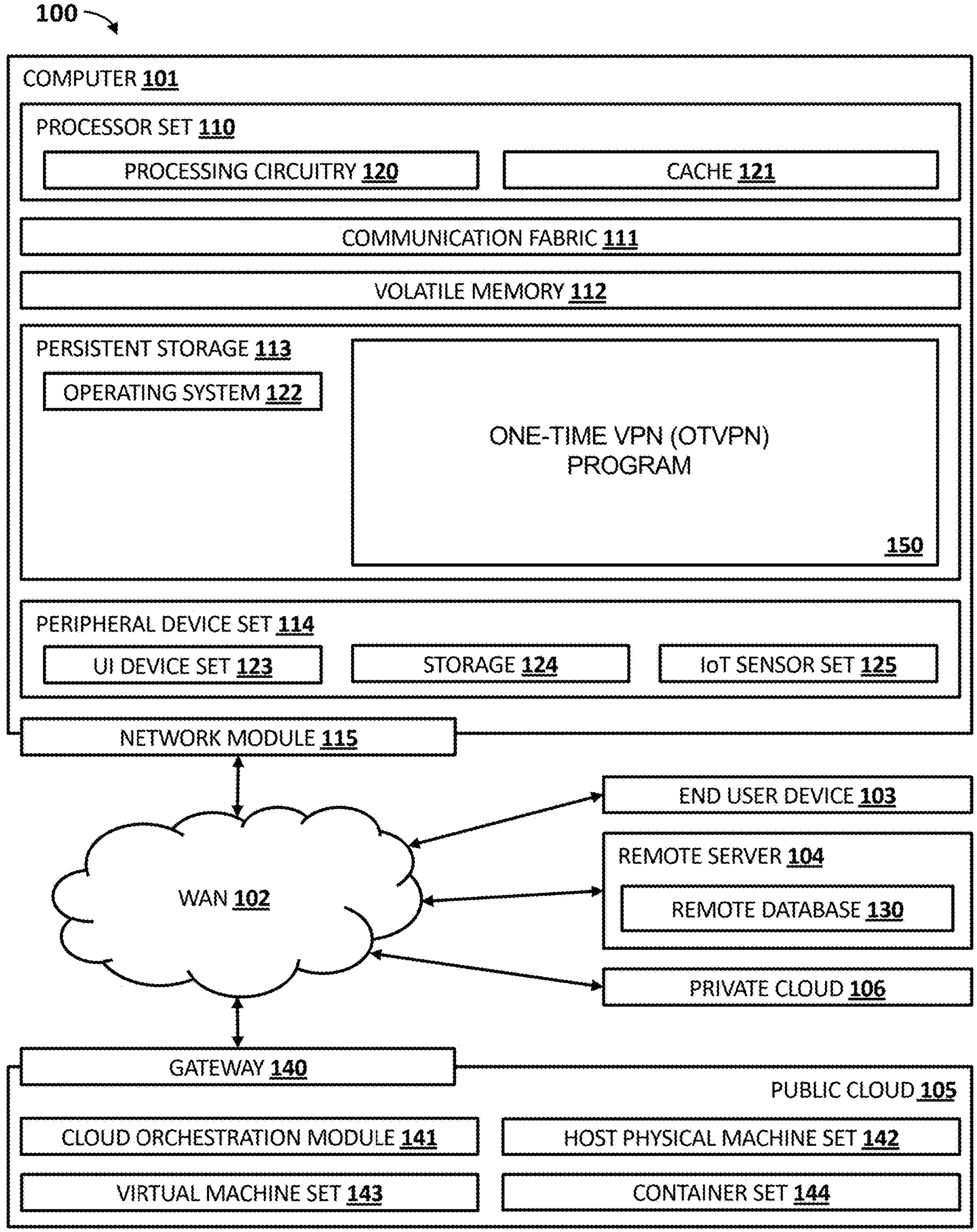
FIG. 1 illustrates a networked computing environment according to at least one embodiment.

The following described exemplary embodiments provide a system, method and computer program product for one-time VPN (OTVPN) tunneling. As such, the present disclosure has the capacity to improve the technical field of network security by implementing temporary, transaction-based VPN access for applications/clients that may not need open access to a private network. More specifically, a computing environment may implement an OTVPN program. The OTVPN program may receive a request from an authorization provider to validate a client key associated with a client for issuing a token to the client, where the token is configured to authorize a pre-defined transaction in a private network. Next, the OTVPN program validate the client key associated with the client and authorize issuance of the token to the client based on the validated client key. Then, the OTVPN program may receive an authentication request from the client to access a private network for a pre-defined transaction. Next, the OTVPN program may validate the client for the pre-defined transaction. Then, the OTVPN program may grant a temporary access for the client to perform the pre-defined transaction in the private network. Thereafter, a policy configuration associated with the pre-defined transaction may trigger the OTVPN program to terminate the temporary access granted to the client to the private network.

As described previously, current VPN solutions include several drawbacks. One major drawback is the increased risk of intrusion into a private network by an unauthorized entity. For example, network breaches often begin with compromised VPN credentials or a compromised client that allows an attacker to access a private network and all resources that reside within the private network. The present disclosure may enable organizations to improve their network security by reducing the number of traditional remote-access VPN clients and replacing traditional VPN access for clients with transaction-based VPN technology.

A VPN may implement a communication protocol, such as a VPN tunnel, that enables secure encrypted movement of data from one network to another. Given the security concerns associated with current VPN solutions, it may be advantageous to, among other things, provide a a temporary VPN tunnel (e.g., one-time VPN (OTVPN) tunnel) that may allow a client (e.g., requestor) access to a private network for a specific request or period of time. The present disclosure may also improve network security by governing high risk transactions and applications with a limited scope. Additionally, the present disclosure may reduce traditional VPN bandwidth by leveraging more OTVPN usage. Further, the present disclosure may enable VPN transaction auditing to enable threat detection.

Thus, the technical field of network security may be improved by the disclosed OTVPN program. According to one embodiment, the OTVPN program may enable a token provider (e.g., via remote token service application programming interface (API)) to create and validate secure one-time tokens using a client key. In one embodiment, the OTVPN program may also enable using secure one-time tokens for VPN Server authentication. In one embodiment, the OTVPN program may also enable a tunnel supervisor to terminate a VPN tunnel based on policy configuration. In one embodiment, the OTVPN program may also enable using policy configurations to define the scope of what a client is authorized to do. In one embodiment, the OTVPN program may further enable switching from a traditional VPN connection to a transaction-based VPN connection to provide auditing of transaction components.

In an example operation, a client such as a web application hosted in the cloud may need to make requests (e.g., using Hypertext Transfer Protocol Secure (HTTPS)) to an endpoint within a private network. In this example, the endpoint in the private network may be in a secure environment without direct access to the internet. According to one embodiment, the private network may implement an authorization provider (e.g., remote token provider/service) to grant a token to the web application that may be used to initiate a temporary, OTVPN tunnel to allow the traffic/request ingress to the private network. The OTVPN tunnel may be implemented to reduce network security risks by significantly limiting what the client can do in the private network. In one embodiment, a OTVPN may be governed with specific access policies such as only allowing traffic to specific endpoints, only allowing a pre-defined quantity of requests, only allowing certain types of transactions (e.g., read-only or write-only), and enforcing transaction count limits per time period.

Embodiments of the present disclosure may also enable switching from a traditional VPN service to a transaction-based VPN in order to audit the transaction components of the client's communications. This switch may be implemented based on a risk event or using a zero trust framework. For example, a client (e.g., operator) may need to investigate why a component within a private network is using a high amount of computing resources. With traditional VPN access, once the client gains access to the private network via the VPN, the client may perform any number of transactions within the private network. Thus, with traditional VPN access, the client must be trusted to only perform actions that are justified for the investigation. However, by implementing the transaction-based VPN (e.g., OTVPN), the client may have a one-time use session (e.g., via one-time use token) that can be associated with a particular ticket. Combined with this audit tracking, additional access logs (e.g., full command history) may be captured, providing a detailed audit trail of the reason the client was accessing the private network, along with all of the actions taken by the client.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, a computing environment 100 according to at least one embodiment is depicted. Computing environment 100 contains an example of an environment for the execution of at least some of the computer code involved in performing the inventive methods, such as OTVPN program 150. In addition to OTVPN program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and OTVPN program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Furthermore, despite only being depicted in computer 101, OTVPN program 150 may be stored in and/or executed by, individually or in any combination, EUD 103, remote server 104, public cloud 105, and private cloud 106.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The OTVPN program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth® (Bluetooth and all Bluetooth-based trademarks and logos are trademarks or registered trademarks of Bluetooth SIG, Inc. and/or its affiliates) connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, a user using any combination of an EUD 103, remote server 104, public cloud 105, and private cloud 106 communicating via WAN 102 to implement the OTVPN program 150 to provide temporary, transaction-based VPN access for applications/clients that may not need open access to a private network.

According to one embodiment, the OTVPN program 150 may leverage tokenization technology to mask a client key and generate a one-time use token used for authentication to establish a OTVPN tunnel. Generally, a client may provide a key (e.g., client key) to a remote token service. Then, the remote token service may validate the key via an API to a VPN Server. Upon successful validation, the remote token service may generate and provide a one-time use token to the client. Next, the client may an authentication request to the VPN server using the token. Then, the VPN server may check whether the token is valid using the remote token service API and if valid the VPN server may establish the OTVPN tunnel. Next, the client may transmit requests to the private network through the OTVPN tunnel. Thereafter, a tunnel controller (e.g., watchdog API) detect that the client request was made using a one-time token and terminate the OTVPN tunnel after completion of the client request.

Embodiments of the present disclosure are explained in more detail below with respect to FIGS. 2 and 3.

Figure 2:
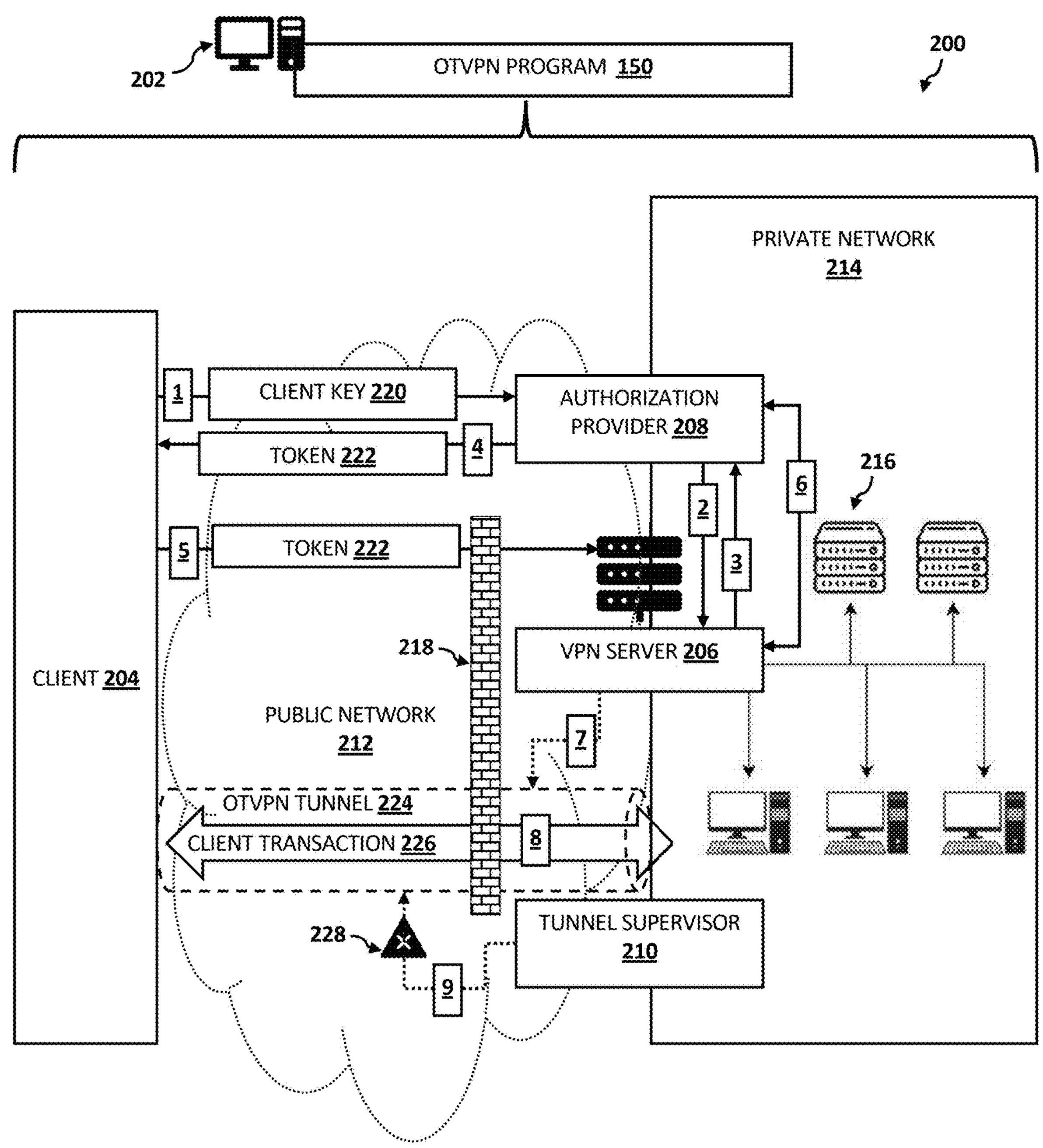
FIG. 2 is a schematic block diagram of network security environment according to at least one embodiment.

Referring to FIG. 2, a schematic block diagram of network security environment 200 according to at least one embodiment is depicted. According to one embodiment, the network security environment 200 may include a computer system 202 having a tangible storage device and a processor that is enabled to run the OTVPN program 150.

For illustrative clarity, only a certain number of components are shown in FIG. 2. However, it is contemplated that various embodiments may include more than one of each component. In addition, some embodiments may include fewer than or greater than all of the components shown in FIG. 2. As such, while not specifically shown in FIG. 2, computer system 202 may include one or more components (e.g., computer 101; EUD 103; remote server 104; WAN 102) of the computer environment 100 described above with reference to FIG. 1.

In various embodiments, the computer system 202 of the network security environment 200 may include at least one client 204, at least one VPN server 206, at least one authorization provider 208, and at least one tunnel supervisor 210. The one or more computers (e.g., computer 101) of the computer system 202 may include a desktop computer, laptop computer, tablet computer, smart phone, smart watch or other wearable computer, mainframe computer, quantum computer or any other form of computer or mobile device now known or to be developed in the future that is capable of running a program, accessing a network, and/or querying a database.

In one embodiment, the OTVPN program 150 may include a single computer program or multiple program modules or sets of instructions being executed by the processor of the computer system 202 (e.g., client 204, VPN server 206). In one embodiment, the OTVPN program 150 may include routines, objects, components, units, logic, data structures, and actions that may perform particular tasks or implement particular abstract data types. In one embodiment, the OTVPN program 150 may be practiced in distributed cloud computing environments where tasks may be performed by local and/or remote processing devices which may be linked through the communication network. In at least one embodiment, the OTVPN program 150 (e.g., the various modules) may be executed on a single computing device (e.g., VPN server 206). In other embodiments, the OTVPN program 150 may be executed on multiple computing devices (e.g., client 204, VPN server 206, authorization provider 208, and tunnel supervisor 210).

According to one embodiment, aspects of the computer system 202 may operate in a cloud computing service model, such as Software as a Service (SaaS), Platform as a Service (PaaS), or Infrastructure as a Service (IaaS). In one embodiment, the computer system 202 may also be implemented as a cloud computing deployment model, such as a private cloud, community cloud, public cloud, or hybrid cloud.

According to one embodiment, the components of the computer system 202 may transmit computer data (e.g., send and receive communications) via any suitable communication network. The communication network may include various types of communication networks, such as the wide area network (WAN) 102, described with reference to FIG. 1. In some embodiments, the WAN may be replaced and/or supplemented by a local area network (LAN), a telecommunication network (e.g., 3G, 4G, 5G), a wireless network, a public switched network and/or a satellite network. In one embodiment, the communication network may include at least one public network 212 and at least one private network 214.

Private network 214 may be associated with a virtual private network established by the VPN server 206. In one embodiment, the private network 214 may be implemented by a corporation or other enterprise seeking to control (e.g., prevent/restrict) public access to one or more protected resources 216 (e.g., data assets, computing assets) within the private network 214. According to one embodiment, access to the protected resources 216 may be controlled by the VPN server 206 (e.g., via identity and access management). In at least one embodiment, the network security environment 200 may also include a firewall 218 (e.g., software and/or hardware) that may cooperate with the VPN server 206 to prevent suspicious traffic from entering or leaving the private network 214 while letting legitimate traffic through.

According to one embodiment, client 204 (e.g., application) may request to connect to the private network 214 over the public network 212 (e.g., internet) to remotely access the protected resources 216 of the private network 214. In one embodiment, the VPN server 206 may authenticate the client 204 and grant the client 204 continuous access to the private network 214 similar to a traditional VPN connection. In one embodiment, the OTVPN program 150 may enable dynamically switching from the traditional VPN connection to a transaction-based VPN connection based on determining a risk event, such as, for example, determining the client 204 to be a high-risk client. In at least one embodiment, the OTVPN program 150 may also enable dynamically switching from the traditional VPN connection to a transaction-based VPN connection in a zero trust framework.

As will be further detailed below, the OTVPN program 150 may enable the VPN server 206 to grant temporary access to allow the client 204 access to the private network 214 for a specific request or a specific period of time.

At event 1, the OTVPN program 150 may enable client 204, seeking to transact within the private network 212, to transmit an authorization request to the authorization provider 208. In one embodiment, the authorization provider 208 may be a component of the VPN server 206 (e.g., same entity) implemented by the OTVPN program 150. In at least one embodiment, the OTVPN program 150 may implement the authorization provider 208 as a separate entity (e.g., server) from the VPN server 206. In another embodiment, the authorization provider 208 may include an authorization service API (e.g., token service API) and the OTVPN program 150 may include an authorization component configured to interact with the authorization service API to authorize the client 204.

According to one embodiment, the authorization request from the client 204 to the authorization provider 208 may include a client key 220 configured to authenticate an identity of the client 204. In various embodiments, the OTVPN program 150 may also enable alternative authentication methods, such as, for example, private/public key pair, client certificate, and mutual transport layer security (mTLS).

In one embodiment, the client 204 may also include, in the authorization request, a scope of the access sought by the client 204. The client 204 may indicate the scope of access by defining a type of transaction (e.g., pre-defined transaction) the client 204 seeks to perform in the private network 214. In one embodiment, the transaction may be defined by request types (e.g., secure hypertext transfer protocol (HTTPS), secure file transfer protocol (SFTP), secure shell (SSH) and the endpoints (e.g., protected resource 216) of the request in the private network 214. For example, the authorization request may be associated with a particular job ticket which may define the transactions the client 204 will need to perform to complete the particular job. As such, the authorization request may include the identity of the client 204 and a pre-defined transaction for which the client 204 is seeking access to the private network 214.

At event 2, the OTVPN program 150 may enable the authorization provider 208 to transmit a request to the VPN server 206 to validate the client key 220. In one embodiment, the VPN server 206 may validate the client key 220 by authenticating a digital identity (e.g., client credentials) in the client key 220 against an identity database. Once the client 204 is authenticated, the VPN server 206 may determine the access rights or permissions (to the protected resources 216) that are linked to the digital identity of the client 204. In one embodiment, the VPN server 206 may compare the transaction defined by the client 204 in the authorization request (e.g., pre-defined transaction) with the access rights linked to the digital identity of the client 204 to determine whether the pre-defined transaction falls within the outer limits of the access rights associated with the client 204. In at least one embodiment, the access rights associated with the client 204 may be governed by role-based access control (RBAC). Under RBAC, the access rights given to the client 204 may be defined by role or job function of the client 204 within the organization.

According to one embodiment, upon determining that the pre-defined transaction requested by the client 204 falls within the outer limits of the access rights associated with the client 204, the OTVPN program 150 may configure an access policy for the pre-defined transaction. In one embodiment, the OTVPN program 150 may generate a policy configuration that scopes the actions permitted by the client 204 to a reduced set of capabilities. In one embodiment, the reduced set of capabilities may be defined in the policy configuration to authorize the client 204 to only perform actions that are necessary to complete the pre-defined transaction. It is contemplated that the reduced set of capabilities may include less capabilities compared to the access rights/permissions linked to the digital identity of the client 204.

According to one embodiment, the policy configuration may indicate the types of actions the client 204 is allowed to perform during the pre-defined transaction (e.g., read-only, write-only, execute). The policy configuration may also indicate a fixed number of requests allowed on the server side, a fixed number of allowed requests from the client side, a fixed time allowed for the pre-defined transaction (e.g., 10 seconds to allow the transaction to complete). The policy configuration may also indicate an end event in a sequence of events to complete the pre-defined transaction. The policy configuration may also indicate the specific protected resources 216 (e.g., endpoints) which may be accessed by the client 204 to perform the pre-defined transaction. It is contemplated that the policy configuration may include alternative/additional limitations to those described above.

At event 3, the OTVPN program 150 may enable the VPN server 206 to transmit a validation response to the authorization provider 208 to authorize the authorization provider 208 to issue an authorization to the client 204 for the pre-defined transaction.

At event 4, upon successful validation by the VPN server 206, the authorization provider 208 may generate and issue an authorization credential to the client 204. In one embodiment, the authorization provider 208 may include a tokenization server and the authorization credential may include a token 222. In one embodiment, the token 222 may represent the authorization granted to the client 204 to access one or more protected resources 216 in the private network 214. In one embodiment, the token 222 may include a disposable, single-use token that may only be used one time to gain access to the private network 214 to perform the pre-defined transaction. As such, the token 222 may not be reused. In one embodiment, the token 222 may also indicate the policy configuration generated by the OTVPN program 150. The policy configuration associated with the token 222 may be used to limit the actions of the client 204 to only the restricted scope of actions. In at least one embodiment, the token 222 may be replaced by any digital authorization credential that may be configured for single use.

At event 5, the OTVPN program 150 may enable the client 204 to transmit an authentication request to the VPN server 206 to access the private network 214 for the pre-defined transaction. In one embodiment, the authentication request from the client 204 to the VPN server 206 may include the token 222 (e.g., single-use token) as a way to represent the authorization granted to the client 204 to access one or more protected resources 216 in the private network 214.

At event 6, the OTVPN program 150 may enable the VPN server 206 to communicate with the authorization provider 208 to determine the validity of the token 222 received from the client 204. If the token 222 is determined to be valid (e.g., token is authentic, token was not used previously) by the authorization provider 208, at event 7, the VPN server 206 establishes a one-time VPN (OTVPN) tunnel 224. The OTVPN tunnel 224 may enable the client 204 (e.g., remote client) to communicate securely across the public network 212 to the private network 214. It is contemplated that the OTVPN tunnel 224 may be configured using various tunneling protocols, such as, for example, Internet Protocol Security (IPSec). In one embodiment, the OTVPN tunnel 224 may include a temporary VPN tunnel (e.g., single-use VPN tunnel) that is configured to grant temporary access to client 204 to perform the pre-defined transaction in the private network 214.

At event 8, the OTVPN program 150 may enable the client 204 to execute a client transaction 226 via the OTVPN tunnel 224. In one embodiment, the client transaction 226 may include the pre-defined transaction associated with the token 222.

According to one embodiment, the OTVPN program 150 may implement the tunnel supervisor 210 to monitor the client transaction 226 through the OTVPN tunnel 224 to decide when the OTVPN tunnel 224 should be terminated. In one embodiment, the tunnel supervisor 210 may be a component of the VPN server 206 (e.g., same entity) implemented by the OTVPN program 150. In at least one embodiment, the OTVPN program 150 may implement the tunnel supervisor 210 as a separate entity (e.g., server) from the VPN server 206. In another embodiment, the tunnel supervisor 210 may include a tunnel supervisor service API and the OTVPN program 150 may include a tunnel supervisor component configured to interact with the tunnel supervisor service API to terminate the OTVPN tunnel 224.

At event 9, the OTVPN program 150 may enable the tunnel supervisor 210 to implement a tunnel termination action 228 responsive to a trigger condition in the policy configuration associated with the token 222. In one embodiment, the trigger condition may include reaching the fixed number of requests allowed on the server side, reaching the fixed number of allowed requests from the client side, and/or reaching the fixed time allowed for the pre-defined transaction. In one embodiment, the trigger condition may also include detecting an action by the client 204 that deviates from the types of actions the client 204 is allowed to perform during the pre-defined transaction (e.g., detecting a write-only operation if the client 204 is only allowed to perform read-only operations). In one embodiment, the trigger condition may also include detecting the end event in a sequence of events to complete the pre-defined transaction. In one embodiment, the trigger condition may also include detecting the client 204 trying to access an unspecified protected resource 216 (e.g., deviating from the specific protected resources 216 indicated in the policy configuration).

In one embodiment, the tunnel termination action 228 may disable the OTVPN tunnel 224 to terminate/revoke the temporary access granted to the client 204 for accessing the private network 214. As such, for subsequent access to the private network 214, client 204 may need to return to event 1 to request a new token 222 from the authorization provider 208. In one embodiment, each pre-defined transaction (e.g., including multiple requests to complete the transaction) by the client 204 may require a new token 222 to establish the OTVPN tunnel 224. In at least one embodiment, each request by the client 204 may require a new token 222 to establish the OTVPN tunnel 224.

Figure 3:
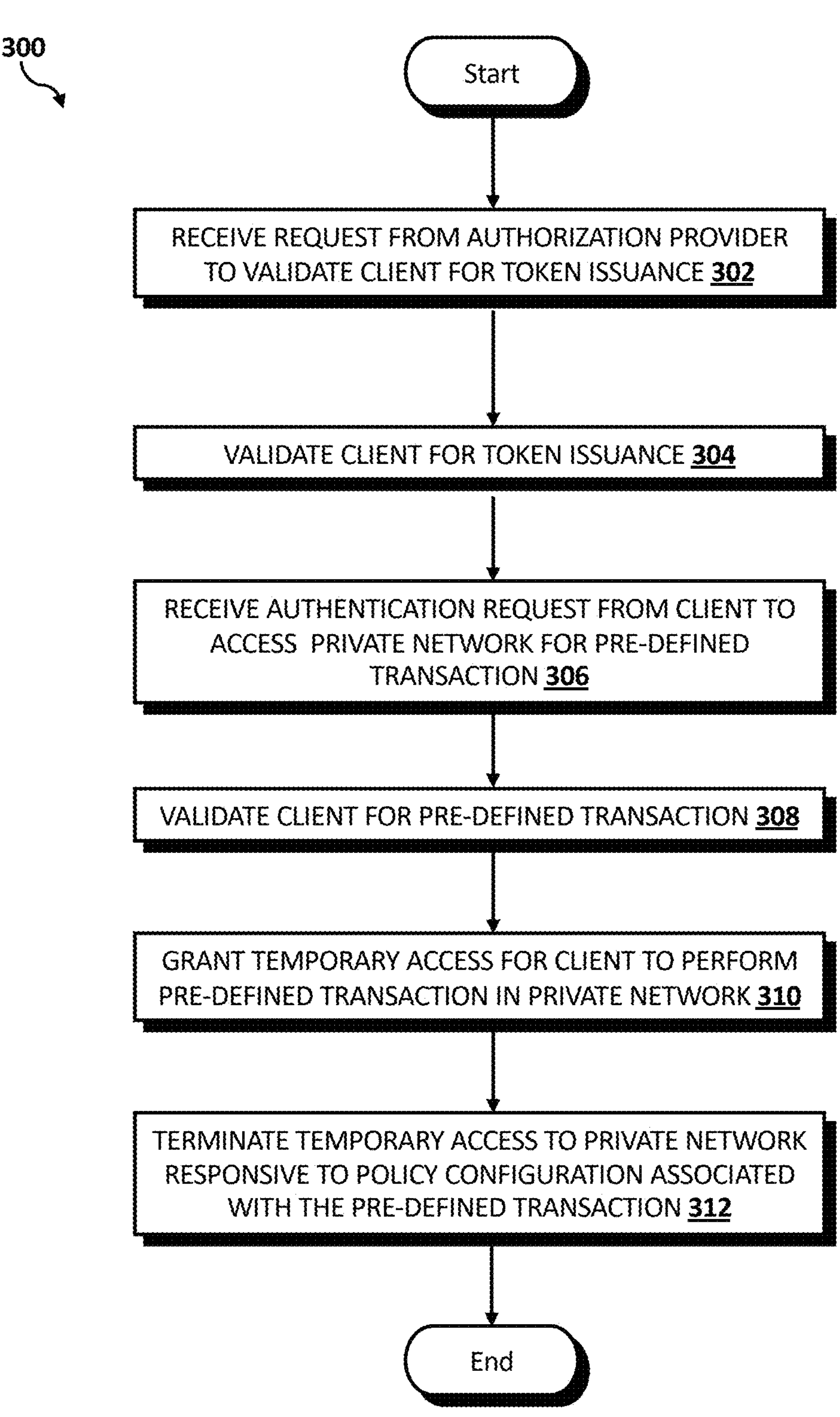
FIG. 3 is an operational flowchart illustrating a process for OTVPN implementation according to at least one embodiment.

Referring now to FIG. 3, an operational flowchart illustrating an exemplary process 300 used by the OTVPN program 150 according to at least one embodiment is depicted. FIG. 3 provides a description of process 300 with reference to the network security environment 200 (FIG. 2).

At 302, a request is received from an authorization provider to validate a client for token issuance. According to one embodiment, the OTVPN program 150 may receive a client key associated with the client from the authorization provider. In one embodiment, the client key may be associated the client seeking authorization to transact within a private network, as described previously with reference to FIG. 2.

Then at 304, the client is validated for token issuance. According to one embodiment, the OTVPN program 150 may validate the client key against an identity database. Once the client is authenticated, the OTVPN program 150 may determine the access rights or permissions that may be linked to the client key of the client, as described previously with reference to FIG. 2. In one embodiment, the OTVPN program 150 may generate a policy configuration that may limit the scope of actions permitted by the client to only perform the actions necessary to complete the pre-defined transaction, as described previously with reference to FIG. 2. In one embodiment, the OTVPN program 150 may transmit a validation response to the authorization provider to enable the authorization provider to issue the token to the client for the pre-defined transaction. As described previously with reference to FIG. 2, the token may include a disposable, single-use token that may only be used one time to perform the pre-defined transaction. In one embodiment, the OTVPN program 150 may embed the policy configuration into the token so that the token may be used to limit the actions of the client to only the restricted scope of actions.

Then at 306, an authentication request is received from the client to access the private network for a pre-defined transaction. Upon successful validation of the client key, the authorization provider may generate and issue the token to the client. The OTVPN program 150 may receive the authentication request including the token as a way to represent the authorization granted to the client to access one or more protected resources in the private network, as described previously with reference to FIG. 2.

Then at 308, the client is validated for the pre-defined transaction. According to one embodiment, the OTVPN program 150 may communicate with the authorization provider to determine the validity of the token received from the client.

Then at 310, a temporary access is granted for the client to perform the pre-defined transaction in the private network. According to one embodiment, if the token is determined to be valid (e.g., token is authentic, token was not used previously) by the authorization provider, the OTVPN program 150 may establish a one-time VPN (OTVPN) tunnel configured to grant temporary access to client to perform the pre-defined transaction in the private network, as described previously with reference to FIG. 2.

Thereafter at 312, the temporary access to the private network is terminated responsive to a policy configuration associated with the pre-defined transaction. According to one embodiment, the OTVPN program 150 may enable the client to perform the pre-defined transaction in the private network via the OTVPN tunnel. According to one embodiment, the OTVPN program 150 may monitor the client transaction through the OTVPN tunnel to decide when the OTVPN tunnel should be terminated. According to one embodiment, the OTVPN program 150 may implement a tunnel termination responsive to meeting/detecting one or more trigger conditions in the policy configuration associated with the token, as described previously with reference to FIG. 2.

According to one embodiment, following the termination of the OTVPN tunnel, the OTVPN program 150 may prevent subsequent access to the private network by the client without a new token.

As described above, the OTVPN program 150 may provide several advantages and/or improvements to the technical field of network security. The OTVPN program 150 may also improve the functionality of a computer because the OTVPN program 150 may enable the computer to use an authorization provider (e.g., remote token service API) to create and validate secure one-time tokens using a client key. The OTVPN program 150 may also enable the computer to use secure one-time tokens for VPN server authentication. The OTVPN program 150 may also enable the computer to terminate a VPN tunnel based on policy configuration. The OTVPN program 150 may also enable the computer to implement policy configurations to define the scope of what a client is authorized to do in a private network that was accessed via a temporary VPN tunnel (e.g., OTVPN tunnel). The OTVPN program 150 may also enable the computer to switch from a traditional VPN connection to a transactional VPN connection to enable auditing of the client's transactions in the private network.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving an authentication request from a client to access a private network for a pre-defined transaction defined by the client, wherein the pre-defined transaction identifies an intended operation to be performed by the client with respect to at least one protected resource in the private network;

validating the client for the pre-defined transaction, wherein the validating comprises determining, for the client, a permitted scope of access in the private network based on a digital identity of the client, private network and comparing the pre-defined transaction defined by the client with the permitted scope of access rights linked to the digital identity of the client to determine whether the pre-defined transaction is within outer limits of the permitted scope of access;

granting a temporary access for the client to perform the pre-defined transaction in the private network, responsive to validating the client for the pre-defined transaction; and terminating the temporary access granted to the client to the private network, responsive to a policy configuration associated with the pre-defined transaction.

2. The computer-implemented method of claim 1, further comprising:

receiving a request from an authorization provider to validate a client key associated with the client for issuing a token, wherein the token is configured to authorize the pre-defined transaction; and authorizing issuance of the token to the client based on validating the client key associated with the client.

3. The computer-implemented method of claim 1, wherein the authentication request from the client includes a single-use token indicating the policy configuration associated with the pre-defined transaction.

4. The computer-implemented method of claim 1, wherein granting the temporary access for the client to perform the pre-defined transaction in the private network further comprises:

generating a one-time virtual private network (OTVPN) tunnel, wherein the OTVPN tunnel is configured to limit the client to the pre-defined transaction.

5. The computer-implemented method of claim 1, wherein the policy configuration authorizes the client to only perform actions that are necessary to complete the pre-defined transaction.

6. The computer-implemented method of claim 4, wherein the OTVPN tunnel is terminated responsive to a trigger condition in the policy configuration, wherein the trigger condition includes reaching a fixed number of requests on a server side.

7. The computer-implemented method of claim 4, wherein the OTVPN tunnel is terminated responsive to a trigger condition in the policy configuration, wherein the trigger condition includes reaching a fixed number of requests on a client side.

8. The computer-implemented method of claim 4, wherein the OTVPN tunnel is terminated responsive to a trigger condition in the policy configuration, wherein the trigger condition includes detecting an action by the client that deviates from a set of actions the client is allowed to perform during the pre-defined transaction.

9. A computer system for one-time virtual private network (OTVPN) tunneling, comprising:

one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:

receiving an authentication request from a client to access a private network for a pre-defined transaction defined by the client, wherein the pre-defined transaction identifies an intended operation to be performed by the client with respect to at least one protected resource in the private network;

validating the client for the pre-defined transaction, wherein the validating comprises determining, for the client, a permitted scope of access in the private network based on a digital identity of the client, and comparing the pre-defined transaction defined by the client with the permitted scope of access to determine whether the pre-defined transaction is within outer limits of the permitted scope of access;

granting a temporary access for the client to perform the pre-defined transaction in the private network, responsive to validating the client for the pre-defined transaction; and terminating the temporary access granted to the client to the private network, responsive to a policy configuration associated with the pre-defined transaction.

10. The computer system of claim 9, further comprising:

receiving a request from an authorization provider to validate a client key associated with the client for issuing a token, wherein the token is configured to authorize the pre-defined transaction; and authorizing issuance of the token to the client based on validating the client key associated with the client.

11. The computer system of claim 9, wherein the authentication request from the client includes a single-use token indicating the policy configuration associated with the pre-defined transaction.

12. The computer system of claim 9, wherein granting the temporary access for the client to perform the pre-defined transaction in the private network further comprises:

generating a one-time virtual private network (OTVPN) tunnel, wherein the OTVPN tunnel is configured to limit the client to the pre-defined transaction.

13. The computer system of claim 9, wherein the policy configuration authorizes the client to only perform actions that are necessary to complete the pre-defined transaction.

14. The computer system of claim 12, wherein the OTVPN tunnel is terminated responsive to a trigger condition in the policy configuration, wherein the trigger condition includes reaching a fixed number of requests on a server side.

15. The computer system of claim 12, wherein the OTVPN tunnel is terminated responsive to a trigger condition in the policy configuration, wherein the trigger condition includes reaching a fixed number of requests on a client side.

16. The computer system of claim 12, wherein the OTVPN tunnel is terminated responsive to a trigger condition in the policy configuration, wherein the trigger condition includes detecting an action by the client that deviates from a set of actions the client is allowed to perform during the pre-defined transaction.

17. A computer program product for one-time virtual private network (OTVPN) tunneling, comprising:

one or more computer-readable storage media and program instructions collectively stored on the one or more computer-readable storage media, the program instructions executable by a processor to cause the processor to perform a method comprising:

receiving an authentication request from a client to access a private network for a pre-defined transaction defined by the client, wherein the pre-defined transaction identifies an intended operation to be performed by the client with respect to at least one protected resource in the private network;

validating the client for the pre-defined transaction, wherein the validating comprises determining, for the client, a permitted scope of access in the private network based on a digital identity of the client, and comparing the pre-defined transaction defined by the client with the permitted scope of access to determine whether the pre-defined transaction is within outer limits of the permitted scope of access;

granting a temporary access for the client to perform the pre-defined transaction in the private network, responsive to validating the client for the pre-defined transaction; and terminating the temporary access granted to the client to the private network, responsive to a policy configuration associated with the pre-defined transaction.

18. The computer program product of claim 17, further comprising:

receiving a request from an authorization provider to validate a client key associated with the client for issuing a token, wherein the token is configured to authorize the pre-defined transaction; and authorizing issuance of the token to the client based on validating the client key associated with the client.

19. The computer program product of claim 17, wherein the authentication request from the client includes a single-use token indicating the policy configuration associated with the pre-defined transaction.

20. The computer program product of claim 17, wherein granting the temporary access for the client to perform the pre-defined transaction in the private network further comprises:

generating a one-time virtual private network (OTVPN) tunnel, wherein the OTVPN tunnel is configured to limit the client to the pre-defined transaction.

* * * * *